C. B. CRIM.
GRADIENT INSTRUMENT.
APPLICATION FILED MAY 9, 1908.

901,888.

Patented Oct. 20, 1908.

Witnesses
C. E. Smith.
P. M. Smith.

Inventor
Charles B. Crim,
By Victor J. Evans
Attorney

UNITED STATES PATENT OFFICE.

CHARLES B. CRIM, OF SEATTLE, WASHINGTON.

GRADIENT INSTRUMENT.

No. 901,888.  Specification of Letters Patent.  Patented Oct. 20, 1908.

Application filed May 9, 1908. Serial No. 431,788.

*To all whom it may concern:*

Be it known that I, CHARLES B. CRIM, a citizen of the United States of America, residing at Seattle, in the county of King and State of Washington, have invented new and useful Improvements in Gradient Instruments, of which the following is a specification.

This invention relates to gradient instruments or instruments of precision for accurately determining angles, slopes and grades, the object of the invention being to provide a simple and accurate instrument especially designed for topographical surveying, also to designate with accuracy grades, slopes and levels, the instrument taking the place of the common slope board or clinometer and being useful in lieu of the ordinary hand level for taking contour topography, the instrument providing for the instantaneous observation of the appropriate graduation on the scale immediately upon the registration of the cross strand or hair with the object and eye piece of the instrument.

With the above and other objects, the invention consists in the novel construction, combination and arrangement of parts as hereinafter fully described, illustrated and claimed.

Figure 1:
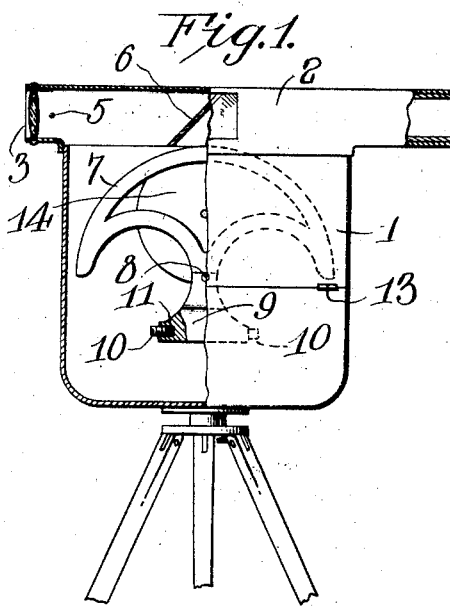
Figure 2:
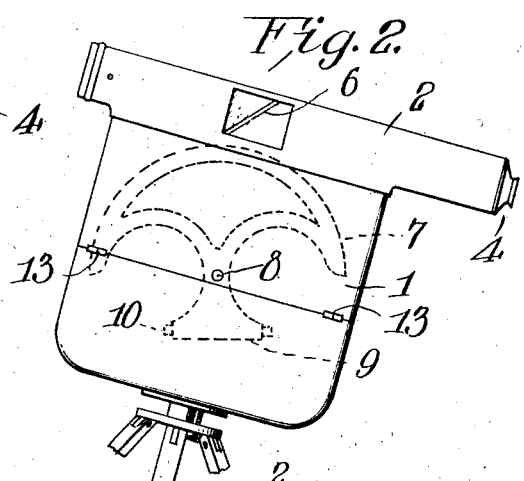
Figure 3:
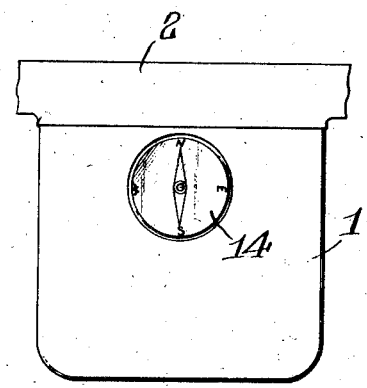

In the accompanying drawing, Figure 1 is a side elevation of the instrument partly in section. Fig. 2 is a side elevation thereof illustrating the relation between the reflector and the graduated scale when the body of the instrument is inclined. Fig. 3 is a reverse elevation of the instrument showing the compass; and Fig. 4 is an enlarged vertical cross-section through the instrument showing the graduations on the scale.

Referring to the drawings, 1 designates the main body or case of the instrument which may be rectangular or of any preferred shape, the said case having mounted thereon a telescope 2 comprising a lens 3 at one end and an eye piece 4 at the other end. Arranged adjacent to the lens 3 is a cross strand or hair 5 disposed horizontally while arranged centrally of the telescope is a reflector 6 disposed at an angle of 45° with respect to the axis of the telescope.

Arranged in the case 1 below the telescope is a graduated scale bearing member 7 which is mounted on a pivot 8 to swing freely adapting the same to be accurately positioned by gravity, the scale bearing member, for that purpose, being provided with a counterpoise 9 extending laterally in opposite directions, as shown in Fig. 1, and provided with adjustable balances 10, preferably in the form of threaded plugs, as shown, adapted to be screwed inwardly and outwardly in threaded sockets 11 in the counterpoise 9.

Figure 4:
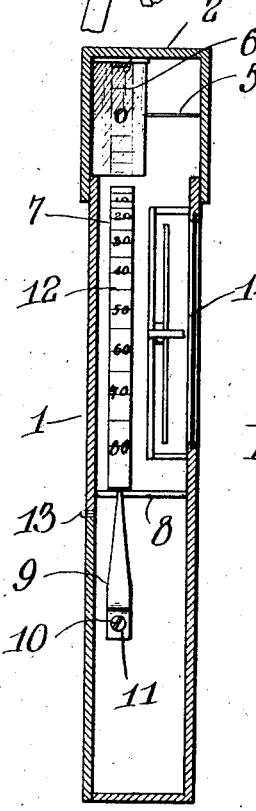

The arcuate edge or periphery of the member 7 is graduated as shown at 12 in Fig. 4, the graduations running from 0 upward. The lower section of one side of the case is hinged as shown at 13 to allow such portion of the case to be swung outward and upward to give access to the interior of the case for adjusting the balances 10. In the opposite side of the case there is arranged a compass 14.

In the use of the instrument, the operator looking through the eye piece 4, adjusts the angularity or inclination of the instrument until the cross hair or strand 5 registers with the desired object. He then glances at the reflector 6 which reflects the appropriate graduation on the member 7. The operator immediately ascertains by observation the degree or angle required. By reference to Fig. 4 it will be observed that the reflector 6 extends only part way across the telescope thereby enabling the strand or cross hair 5 to be simultaneously observed. To adjust the instrument, the telescope is brought to a perfectly horizontal position by any suitable means, after which the balances 10 are adjusted until the hair line 5 registers exactly with zero on the scale.

Having thus fully described the invention, what is claimed as new is:—

1. In an instrument of the class described, the combination with a balanced scale bearing member, of a telescope embodying an eye piece, a cross strand, and a reflector, the latter being arranged to display the graduations of the scale and indicate the relation between such graduations and the cross strand.

2. In an instrument of the class described, a pivotally mounted scale bearing member, means for balancing the same, and an observation device embodying an eye piece, a cross strand, and a reflector arranged to permit the vision to simultaneously take in the cross strand and the graduations of the scale.

3. In an instrument of the class described, a balanced scale bearing member, in combination with an observation device comprising an eye piece at one end, a cross strand located at a distance from the eye piece, and a reflector set at an angle to the line of vision and of a width permitting a simultaneous view of the cross strand and the adjacent graduations of the scale.

4. In an instrument of the class described, the combination with an observation device embodying an eye piece, a cross strand, and a reflector, of a case, a scale bearing member pivotally supported in said case, and adjustable balances having a threaded engagement with the scale bearing member, substantially as described.

In testimony whereof I affix my signature in presence of two witnesses.

CHARLES B. CRIM.

Witnesses:
G. W. SLATER,
FRED GRAHAM.